Aug. 2, 1932.                S. LEVINE                1,870,058
                            GAUGE DEVICE
                    Filed June 26, 1928    2 Sheets-Sheet 1
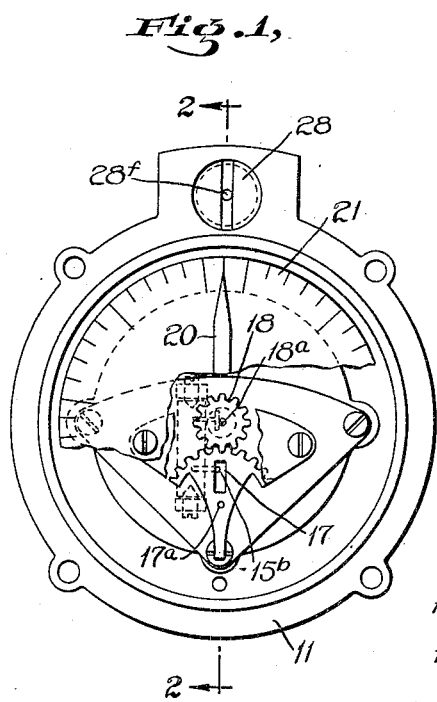
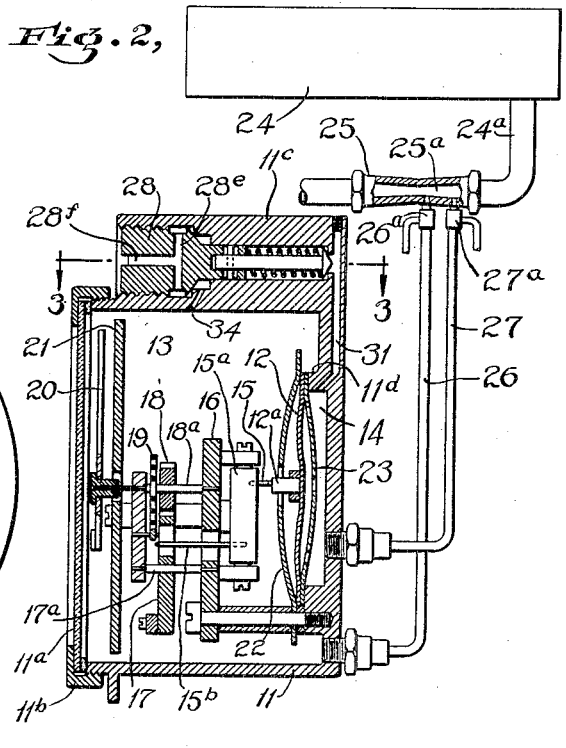
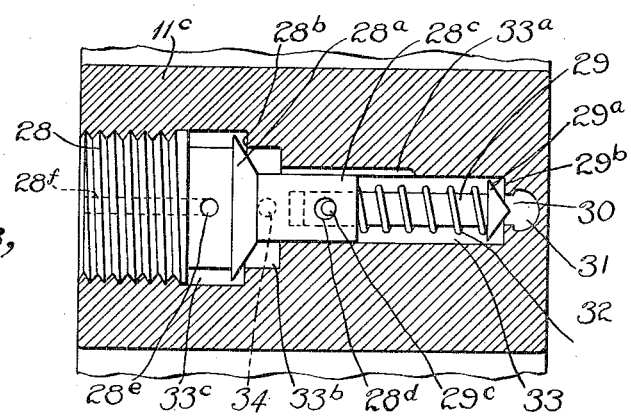
INVENTOR
Samuel Levine
BY
ATTORNEY Aug. 2, 1932.   S. LEVINE   1,870,058
GAUGE DEVICE
Filed June 26, 1928   2 Sheets-Sheet 2
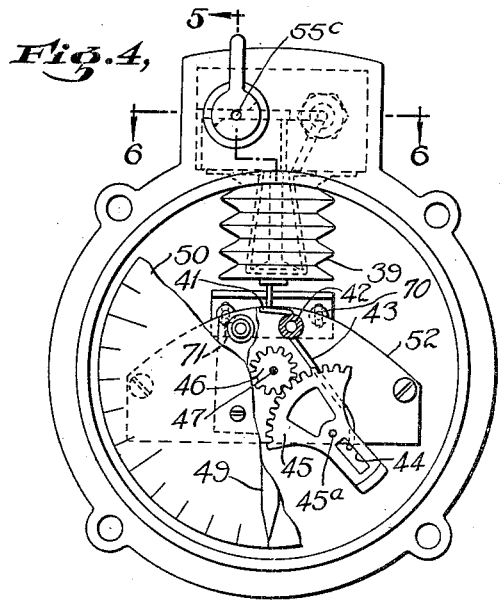
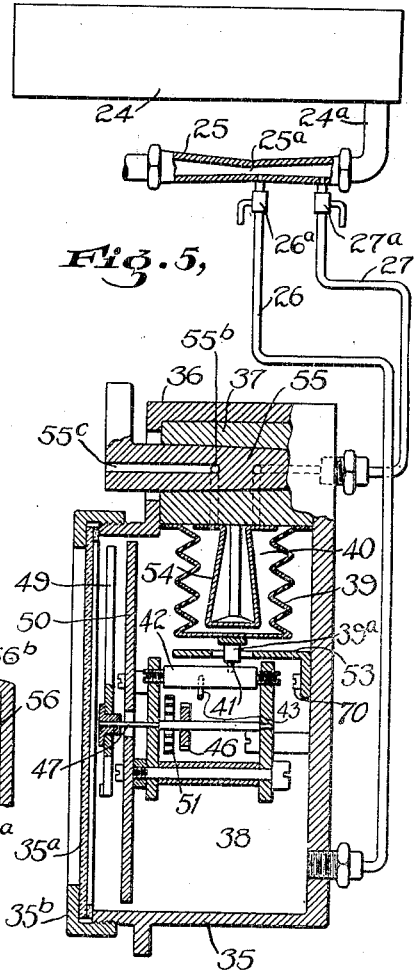
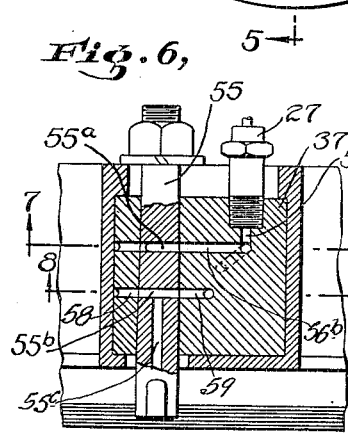
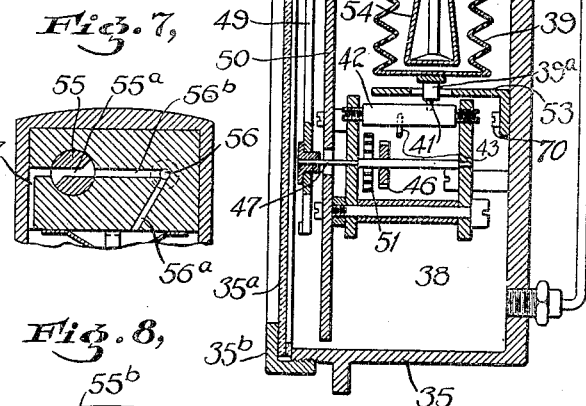
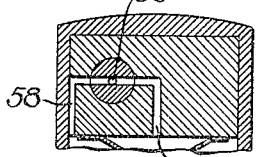
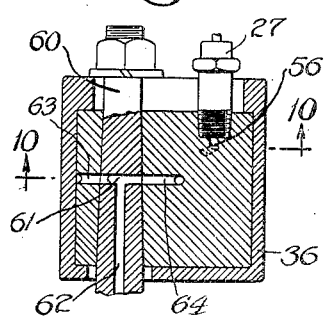
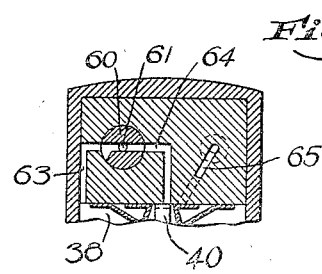
INVENTOR
Samuel Levine
BY
ATTORNEY Patented Aug. 2, 1932

1,870,058

UNITED STATES PATENT OFFICE

SAMUEL LEVINE, OF PASSAIC, NEW JERSEY, ASSIGNOR, BY MESNE ASSIGNMENTS, TO SOL H. LEVINE, OF PASSAIC, NEW JERSEY

GAUGE DEVICE

Application filed June 26, 1928. Serial No. 288,405.

This invention relates to gauge devices and particularly to devices of this class for use in connection with pipe lines for gauging or indicating the flow of a fluid through a pipe from a tank or other supply to a predetermined apparatus or discharge, and more particularly to gauging the flow of liquid fuel from a fuel storage tank to an engine in aeroplanes and other apparatus of this class; and the object of the invention is to provide a gauge device of the class specified employing a diaphragm, bellows or like flexing body for actuating the indicating needle or element of the device, and with means disposed at opposite sides of the movable part of a diaphragm, bellows or the like for reinforcing the same and limiting the movement thereof, preventing its destruction or rupture by being subjected to excess pressure; a further object being to provide a device of the class and for the purpose specified with an improved valve construction for controlling the exposure of differential pressures existing in a Venturi tube placed in a fuel line to the opposite sides of the diaphragm or similar body when connecting or disconnecting the gauge device with the Venturi tube, thereby obviating to a major degree the action of an excess pressure on either side of the diaphragm, thus rendering gauge devices of the class specified more reliable and accurate in operation and dependable in use; and with these and other objects in view, the invention consists in a device of the class and for the purpose specified, which is simple in construction, efficient in use and which is constructed as hereinafter described and claimed.

The invention is fully disclosed in the following specification of which the accompanying drawings form a part, in which the separate parts of my improvement are designated by suitable reference characters in each of the views, and in which:

Fig. 1 is a face view of a gauge device made according to my invention, with part of the construction broken away and in section.

Fig. 2 is a transverse section on the line 2—2 of Fig. 1, and indicating the gauge device in operative connection with a fuel pipe and a Venturi passage in said pipe.

Fig. 3 is a sectional, detail view taken on the line 3—3 of Fig. 2.

Fig. 4 is a view similar to Fig. 1, showing a modification.

Fig. 5 is a view similar to Fig. 2 showing the modified form of construction seen in Fig. 4, the section being on the line 5—5.

Fig. 6 is a section on the line 6—6 of Fig. 4.

Fig. 7 is a section on the line 7—7 of Fig. 6.

Fig. 8 is a section on the line 8—8 of Fig 6.

Fig. 9 is a view similar to Fig. 6 showing a modification; and,

Fig. 10 is a section on the line 10—10 of Fig. 9.

In Figs. 1 and 2 of the drawings, I have shown at 11, the casing of a gauge device made according to my invention, said casing being substantially cup-shaped in form and the open end of which is closed by a transparent panel 11a, held in position by a retaining ring 11b. The upper wall of the casing is provided with an enlargement 11c.

The back wall of the casing 11 is provided with an inwardly directed angular seat 11d on which is mounted and secured the peripheral edge of a diaphragm 12 forming within the casing, two chambers 13 and 14, subdivided by the diaphragm 12.

Centrally of the diaphragm 12 and extending into the chamber 13 is a block 12a adapted to engage a radially projecting pin 15 on a rocker shaft 15a supported in horizontal bearings forming part of a supporting frame 16 arranged in the chamber 13. Another radially extending arm 15b extends into an elongated aperture in a segmental gear 17, said gear being pivoted as seen at 17a whereby the inward and outward flexing of the diaphragm will transmit rotary, oscillatory movement to said gear segment 17, causing a pinion 18 to be correspondingly rotated in one direction through the action of the diaphragm 12 against the tension of a clock-type spring 19 which serves to normally maintain the pin 15 in constant engagement with the block 12a. On the shaft 18a of the pinion 18 is supported the indicating finger 20 of the device which is movable relatively to a suitable pressure indicating dial 21 supported in the chamber 13 inwardly of the finger 20, said finger being arranged inwardly of the panel 11a.

Arranged at opposite sides of the diaphragm 12 are two concavo-convex reinforcing and backing members 22 and 23, the backing member 22 being arranged within the chamber 13 and being apertured centrally to expose the diaphragm 12 to the chamber 13 and the member 23 is arranged within the chamber 14 and is also apertured to expose the diaphragm to said chamber.

For the purpose of illustrating one use of my invention, I have indicated at 24 a fuel and gasoline storage or supply tank from which fuel is transmitted to an engine or other apparatus through a pipe 24a in which is located at a predetermined point, a Venturi tube 25, the contracted area 25a of which is placed in communication with the chamber 13 through a pipe 26 in which is arranged a valve 26a whereas another pipe 27 communicates with the Venturi tube 25 at a point forwardly of the contracted area 25a and also communicates with the chamber 14, the latter pipe having a control valve 27a.

With this construction, the differential pressures of the fuel flow existing in the comparative areas of the Venturi tube with a constant or varying head of fuel in the tank 24, will cause the diaphragm 12 to be actuated to indicate through its needle and dial, the rate of fuel consumed during predetermined stages of operation of an engine in the use of the apparatus.

Mounted in the body 11c of the casing is a ported plug valve 28 having a conical portion 28a adapted to cooperate with a seat 28b in the body 11c. Inwardly of the conical portion is a hollow stem 28c in which a valve 29 is mounted, the valve having at one end an enlarged conical head 29a cooperating with a seat 29b to control a port 30 leading to a passage 31 extending longitudinally of the back wall of the casing and opening into the chamber 14. A spring 32 is adapted to retain the conical head 29a normally in seated position and the valve 29 has a pin 29c operating in an enlarged aperture 28d in the sleeve 28c, sufficient clearance being allowed to permit of the opening and closing of the valve 29.

The port 33 in which the sleeve 28c and valve 29 are mounted is provided with a passage 33a to place said port in communication with an enlarged portion 33b of said port, controlled by the conical portion 28a. Communicating with the enlarged portion 33b is a passage 34 which opens into the chamber 13. Another and larger port 33c is arranged outwardly of the port 33b and a port 28e extending transversely through the plug valve 28 communicates with the port 33c. An axial port 28f communicates with the bore 28e and opens outwardly through the outer face of the plug 28 to atmosphere. The plug 28 is in threaded engagement with the member 11c and movable toward and from the seat 28b.

In the use of my improved gauge device and in putting the same into initial operation, the plug valve 28 is turned outwardly to place the ports 33b and 33c in communication so as to allow air contained in the chambers 13 and 14 to escape to atmosphere through the port 28f, after which the valves 26a and 27a are opened and the instrument is primed. The fuel passes through the pipes 26 and 27 and into the respective chambers 13 and 14 until all of the air has been discharged from said chambers and the fuel starts flowing through the passage 28f after which the plug valve 28 is closed. In closing the valve, passage 31 will be closed by the conical head 29a before passage 34 is closed by the conical portion 28a. Thus, the chamber 14 is cut off from atmosphere and the pressure existing in the pipe 27 will exist in the chamber 14 and the force exerted on diaphragm 12 will be to the left, that is, in a direction in which the diaphragm 12 is built so it can withstand a reasonable amount of pressure without buckling or rupturing. After chamber 13 is cut off from the atmosphere by the conical portion 28a, the pressure in the chamber 13 will be that of pipe 26, or the throat of the venturi.

In this operation, the differential pressures existing in the venturi 25 where the pipes 26 and 27 communicate therewith, will transmit movement to the diaphragm 12 by the existence of said differential pressures in the chambers 13 and 14, causing the diaphragm 12 to move outwardly or to the left as seen in Fig. 2 of the drawings, by virtue of the greater pressure in the pipe 27 to actuate the needle 20 to indicate upon the dial, the rate of flow of fluid in the pipe 24a. The difference in pressure existing in the two portions of the Venturi tube, which actuates the diaphragm 12, is a function of the velocity of flow existing in the pipe 24a. Knowing the cross section of the venturi, the dial 21 can be calibrated so as to give the reading of the actual amount of fluid flowing per unit time in the pipe 24a; in other words, it would indicate the rate of flow. It will be understood that the valve 29 is held closed by the spring 32 under the normal operation of the device. It will be understood that prior to closing the plug valve 28, the pressure in both chambers 13 and 14 is substantially similar, but in closing said plug valve, the valve 29 closes slightly in advance of said plug valve, subdividing the two chambers without exerting excessive pressure or stress upon the diaphragm 12. However, any excessive pressure that may act upon the diaphragm 12 will be checked and reinforced by either one of the members 22 and 23, which permit of limited movement or flexing of the diaphragm in either direction as will be apparent.

In Figs. 4 and 5 of the drawings, I have shown another form of device which will operate to produce the same results. In said figures, 35 represents the casing, 35a a transparent panel closing the open end of the casing and held in place by a retaining ring 35b. The casing has an enlargement 36 at its upper end in which a valve body 37 is mounted, said valve body carrying within the chamber 38 of the casing a bellows 39 within which is a chamber 40, the lower wall of the bellows carrying a plug 39a adapted to cooperate with a pin 41 on a rocker shaft 42, said rocker shaft having another arm 43. The free end of the arm 43 operates in connection with an elongated aperture 44 in a gear segment 45, the gear segment being pivoted as seen at 45a. The gear segment 45 meshes with a pinion 46 on a shaft 47 on which is mounted an indicating finger 49 cooperating with the dial 50 of the device. A spring 51 is employed to normally retain the pin 41 in engagement with the block 39a, the bellows 39 operating against the tension of said spring to advance the pointer 49 as will be apparent.

The several operative parts of the device are mounted in connection with suitable frame pieces 52. Mounted in the chamber 38 is a stop wall 53 for limiting the movement of the bellows in one direction, a similar stop wall or member 54 being arranged in the chamber 40 to limit the movement of the bellows in the opposite direction. Stop wall 53 is adjustably mounted on the casing by means of screws 70 cooperating with slots 71 in the side flange of wall 53. By means of the slots 71, stop-wall 53 may be shifted relative to bellows 39, and screws 70 will hold 53 in any of its shifted positions.

In Fig. 5 of the drawings, I have shown a tank 24 similar to that shown in Fig. 2 of the drawings, together with the venturi 25, pipes 26 and 27, valves 26a and 27a, the feed pipe 24a and the restricted area 25a, similar in all respects to the structure shown in Fig. 2. But, instead of placing the pipes 26 and 27 in communication with the chambers 13 and 14, the pipe 26 is placed in communication with the chamber 38 and the pipe 27 is placed in communication with the chamber 40 through a valve 55 arranged in the valve body 37.

Upon a consideration of Figs. 6 and 7 of the drawings, it will be noted that the pipe 27 communicates with a port 56 which in turn extends to the chamber 40 through the branch 56a and also to the valve 55 through the branch 56b. The valve 55 has a port 55a controlling the communication between the port 56b and a passage 57 leading to the chamber 38. Another port 55b is arranged in the valve 55 and is in communication with a longitudinal port 55c opening outwardly through the valve to atmosphere. The port 55b is also adapted to communicate with ports or passages 58—59 leading to the chambers 38 and 40 respectively, as clearly seen in Fig. 8 of the drawings.

It will be seen from a consideration of Figs. 4 to 8 inclusive that in exhausting the air from both chambers 38 and 40, the valve 55 is moved into the position shown in Figs. 6, 7 and 8, allowing the fuel to fill both of said chambers and pass out through the port 55c. In rotating the valve 55 to close the communication between the ports and passages 56b—57 and 58 and 59, 58 and 59 will be disconnected before 56b and 57 are disconnected. This closes the communication between chambers 38 and 40 and the atmosphere before they are subjected to the pressures existing in the pipes 26 and 27. Thus, there is no danger of exposing one of the chambers to atmospheric pressure while the other will be subjected to the pressure existing in the pipe 24, a condition which would place excessive pressure on bellows 39, which would be damaged. In completely rotating the valve 55, the chambers 38 and 40 will be subdivided and the differential pressure will act upon the bellows to depress the lower wall thereof, advancing the block 39a, oscillating the shaft 42, segmental gear 45 and pinion 46 to advance the needle 49. Should the bellows be subjected to excessive pressure, the reinforcing or stop walls 53 and 54 will take up and resist the stress or strain applied thereto.

In Figs. 9 and 10 of the drawings, I have shown a modification in the construction of the control valve 55. In said figures, the reference characters 56, 27 and 36 represent similar parts of the device shown in Figs. 4 and 5 of the drawings. In Figs. 9 and 10, I substitute for the valve 55, a valve 60 having one transverse port 61 communicating with a longitudinal bore 62 opening outwardly to atmosphere and also communicating with passage 63 and 64 formed in the valve body 56, the passage 63 communicating with the chamber 38 and the passage 64 with the chamber 40. The pipe 27 is placed in communication with the chamber 40 through a passage 65.

With this construction, when the valve is in open position, it will be seen that the air in the chambers 38 and 40 will be discharged through the ports 63, 64, 61 and 62. In rotating the valve, it will be seen, by virtue of the cross sectional form of the port 61, that the passage 64 is closed prior to the passage 63 and this construction will act in the same manner as that shown in Figures 5, 6 and 7, but my invention is not necessarily limited to this specific arrangement.

In disconnecting the gauge device from the venturi, the valves 28 or 55 will be turned in reverse direction. The cycle of connecting and disconnecting the various passages and ports will take place in reverse order. Thus the chamber connected to the pipe 26 will always be open to atmosphere before the chamber connected to the pipe 27. This will always allow the inside of the pressure capsule, which is chamber 14 in Fig. 2, and chamber 40 in Fig. 5, to be subjected to pressure, and the capsule is built so as to normally take pressure in such a direction. It is obvious that if chambers 14 and 40 were exposed to atmospheric pressure while chambers 13 and 38 are under the pressure in pipe 26, the atmospheric pressure in pipe 26 being higher would tend to collapse or buckle the flexible members of the device. Thus my improved valve for priming and disconnecting the differential pressure device used with a venturi, obviates the danger of injury or breakage of the pressure responsive member used in such devices.

It will be understood that while I have shown certain details of construction for carrying my invention into effect, and have referred to a specific use thereof, that my invention is not necessarily limited in these respects, and various changes in and modifications of the construction herein shown and described may be made within the scope of the appended claims without departing from the spirit of my invention or sacrificing its advantages.

Having fully described my invention, what I claim as new and desire to secure by Letters Patent, is:—

1. In a pressure gauge for measuring the pressure difference of a liquid flowing through a Venturi tube, a casing having a cavity, a block fitting said cavity, pressure responsive means attached to the block and dividing the casing into two chambers, said block having passageways connecting the two chambers to each other and to the atmosphere, a valve in said block controlling the communication between said passageways, means for connecting one of said chambers to the high pressure portion of the Venturi tube, means for connecting the other of said chambers to the low pressure portion of the Venturi tube, indicating means, motion transmitting means for connecting the indicating means to the pressure responsive means for actuating the indicating means in response to the actuation of the pressure responsive means by the pressure variation of the flow through the Venturi tube, means attached to the block for limiting the movement of the pressure responsive means in one direction, stop means attached to the casing for limiting the movement of the pressure responsive means in the other direction, and means for adjusting the position of the stop means relative to the pressure responsive means.

2. In a pressure gauge, a casing having an open end, removable closure means for said end, a pressure responsive unit passable through the open end, means in said casing for mounting the pressure responsive unit, said unit comprising a block, pressure responsive means mounted on said block and forming an inclosed chamber between the block and the pressure responsive means, a valve seat in said block, said block having passageways connecting the valve seat to the interior of the inclosed chamber and to the exterior of the block, and thereby to the interior of the casing, a valve in the valve seat for controlling the passageways, said valve having a passage opening into the atmosphere said valve having additional passages for connecting selectively the formed chamber and the casing to each other or to the passage leading to atmosphere.

3. In a pressure gauge, a casing having an open end, removable closure means for said end, a pressure responsive unit passable through the open end, means in said casing for mounting the pressure responsive unit, said unit comprising a block, pressure responsive means mounted on said block and forming an inclosed chamber between the block and the pressure responsive means, a valve seat in said block, said block having passageways connecting the valve seat to the interior of the inclosed chamber and to the exterior of the block, and thereby to the interior of the casing, a valve in the valve seat for controlling the passageways, said valve having a passage opening into the atmosphere, said valve having additional passages for connecting selectively the formed chamber and the casing to each other or to the passage leading to atmosphere and stop means located in the formed chamber and attached to the block for limiting the movement of the pressure responsive means in one direction, and stop means adjustably mounted on the casing for limiting the movement of the pressure responsive means in the opposite direction.

4. In a pressure gauge, a casing, means in said casing for mounting a pressure responsive unit, a pressure responsive unit fitting said mounting means, said pressure responsive unit comprising a block, a pressure responsive element attached to the block and forming a chamber between the block and the pressure responsive element, said block having passageways for connecting the formed chamber to the exterior of the block and thereby to the interior of the casing, a valve mounted in the block for controlling the passageways, and means for operating said valve, the casing having means for exposing said valve operating means to the exterior of the casing.

5. A pressure responsive unit for pressure gauges comprising a block, a pressure responsive element attached to said block to form a chamber between said element and block, said block having passageways establishing communication between the interior of the formed chamber and the exterior of said block, a valve seat in said block communicating with said passageways, a valve mounted in said seat controlling the passageways and means located in the formed chamber and attached to the block for limiting the motion of the pressure responsive element.

6. In a differential pressure gauge for measuring the pressure drop of a fluid flow thru a Venturi tube, or similar restriction, a casing, a pressure responsive element dividing said casing into two chambers, means for connecting one chamber to the high pressure portion of the Venturi-tube, means for connecting the other chamber to the low pressure portion of the Venturi-tube, means for indicating the differential pressure exerted on the pressure responsive element, and a valve mounted inside the casing, said valve having a duct leading to the atmosphere and passageways leading to the chambers, all constructed and arranged to connect the two chambers to each other and to the atmosphere in a predetermined sequence upon motion of the valve in one direction, and to disconnect the two chambers from each other and from the atmosphere upon the reverse motion of the valve, the above sequence being reversed, means for operating the valve, and the casing having means for exposing the valve operating means to the exterior of the casing.

In testimony that I claim the foregoing as my invention I have signed my name this 25th day of June, 1928.

SAMUEL LEVINE.